United States Patent [19]

Fukuoka et al.

[11] Patent Number: 4,867,299
[45] Date of Patent: Sep. 19, 1989

[54] APPARATUS FOR DISTRIBUTING VENEER SHEETS

[75] Inventors: Yoshioki Fukuoka, Nishio; Kazuo Hamajima, Toyoake; Michioki Takaba, Ohbu; Yoshimi Suzuki, Nagoya; Shinpei Seki, Tsushima; Katsunori Kinoshita, Komaki; Akihiro Mizuno, Aichi, all of Japan

[73] Assignee: Meinan Machinery Works, Inc., Japan

[21] Appl. No.: 218,678

[22] Filed: Jul. 13, 1988

[30] Foreign Application Priority Data

Jul. 16, 1987 [JP] Japan ................... 62-178121

[51] Int. Cl.⁴ .............................................. B65G 47/26
[52] U.S. Cl. .................................. 198/435; 198/437; 198/463.3; 414/331
[58] Field of Search ............ 198/435, 436, 437, 463.3; 414/247, 331; 271/296, 302

[56] References Cited

U.S. PATENT DOCUMENTS

| | | | |
|---|---|---|---|
| 2,649,182 | 8/1953 | Parker | 198/435 |
| 2,799,381 | 7/1957 | Beckley | 198/435 |
| 3,565,725 | 2/1971 | Siempelkamp | 198/435 X |
| 4,603,768 | 8/1986 | Deutschle | 198/369 |
| 4,621,969 | 11/1986 | Berghäll et al. | 414/331 |
| 4,634,333 | 1/1987 | Butterly, Jr. et al. | 198/435 X |

Primary Examiner—Robert J. Spar
Assistant Examiner—Cheryl L. Gastineau
Attorney, Agent, or Firm—Lahive & Cockfield

[57] ABSTRACT

Apparatus for distributing veneer sheets comprises a pair of vertically-movable upper and lower relay conveyors for receiving veneer sheets from a veneer conveyor and supplying the sheets to different treating sections of different heights of a veneer treating system, such as a veneer drying system. When receiving the sheet from the veneer conveyor, each relay conveyor is horizontally aligned with the veneer conveyor. When supplying the sheet to the treating section, each relay conveyor is in a position adjacent to the section. Each relay conveyor may receive a veneer sheet while the other conveyor is supplying the sheet to the treating section.

1 Claim, 5 Drawing Sheets

APPARATUS FOR DISTRIBUTING VENEER SHEETS

FIELD OF THE INVENTION

This invention relates to apparatus for distributing veneer sheets and particularly to apparatus for distributing veneer sheets to a veneer treatment system, such as a veneer drying system, having plural treating sections of different heights.

BACKGROUND OF THE INVENTION

One of the prior art apparatus for distributing veneer sheets to a veneer treatment system, such as veneer drying system, having plural treating sections of different heights is a swinging-type distributing apparatus Z illustrated in FIG. 6. The prior art distributing apparatus Z is a conveyor having one end located in close proximity to a preceding veneer-sheets conveyor X and connected to a pivot for swinging movement. The apparatus Z is swung to distribute veneer sheets received from the conveyor X to plural treating sections of different heights of a veneer treating system Y.

One of the drawbacks of the conventional swinging-type distributing apparatus in that it must be swung within the angles which do not cause the sheet thereon to come back down toward the preceding conveyor X or go down toward the treating system Y. Therefore, the swinging-type apparatus must be manufactured to have a considerably great length in comparison with the veneer sheets to be distributed, so that that apparatus need not be swung beyond the foregoing angles and hence may convey the sheets in a stable manner between the preceding conveyor and the treating system. Thus, the greater the number of the treating sections of different heights of the treatment system, a longer distributing apparatus must be used. Hence, the swinging-type distributing apparatus occupies a relatively large space.

Also, where veneer sheets are to be distributed to a veneer treating system such as Y (drying system) of FIG. 6, as illustrated in FIG. 6, the swinging-type apparatus requires the front ends of the upper and lower components of each treating section of the treating system to be disposed out of vertical alignment with each other such that the veneer sheet may be smoothly supplied between the two components. Also as illustrated, in such a case, the swinging-type apparatus requires the whole front end portion of each treating section to be disposed out of vertical alignment with those of the other treating sections for the smooth supply of the sheets into each treating section. And if the front end portions of the treating sections are disposed out of vertical alignment, inner parts (such as heating plates) of each treating section must be correspondingly disposed out of vertical alignment with those of the other treating sections. Such a necessity makes the construction of the entire treatment system extremely complicated.

SUMMARY OF THE INVENTION

An object of the invention is to provide an apparatus for distributing veneer sheets to a veneer treating system having plural treating sections of different heights.

Another object of the invention is to provide such an apparatus which occupies less space than the conventional swinging-type distributing apparatus.

Still another object of the invention is to provide such an apparatus which does not require the treatment system to be modified for the receipt of veneer sheets from the apparatus.

DETAILED DESCRIPTION OF THE PREFERRED EMBODIMENTS

Figure 1:
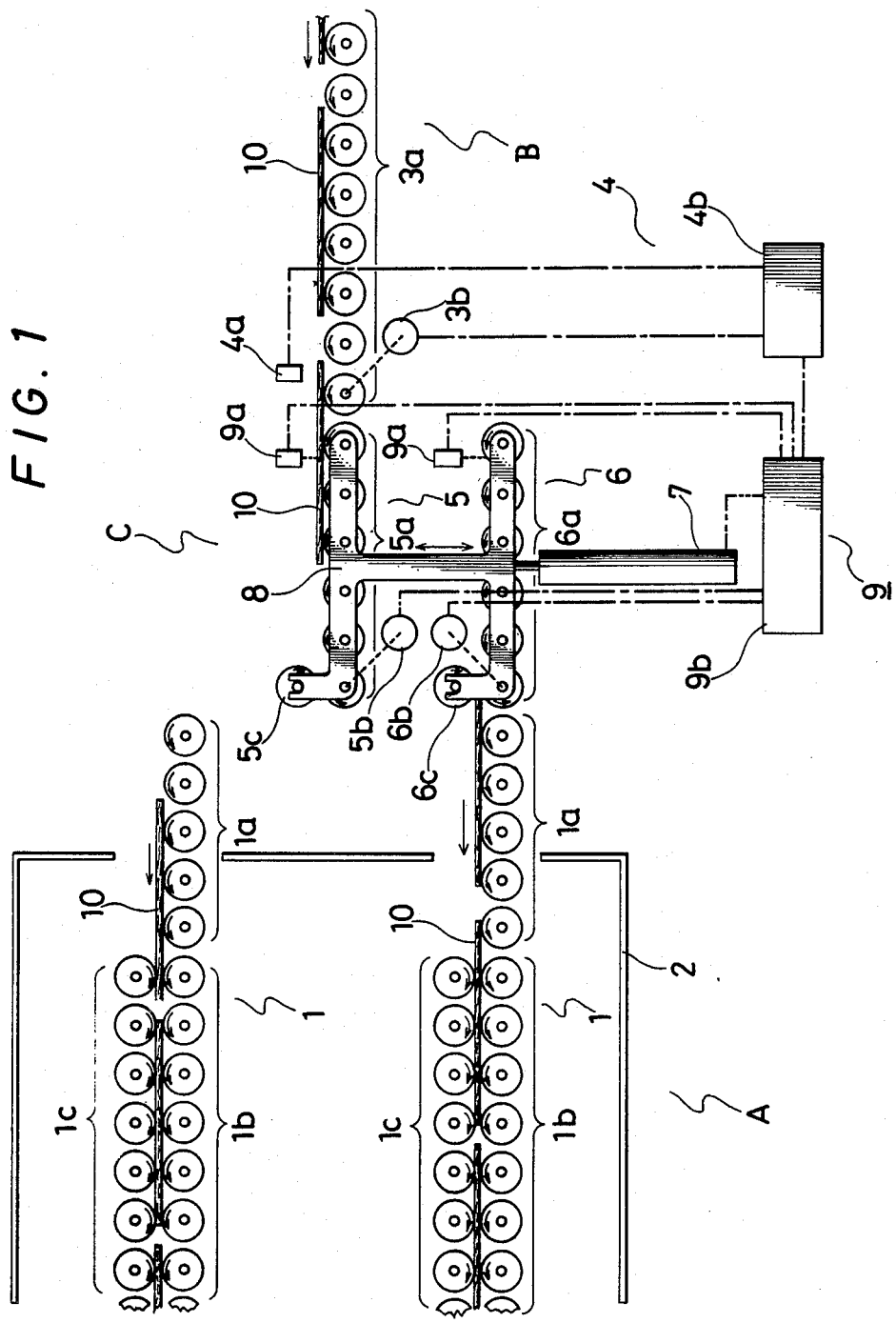
FIGS. 1 and 2 show a first embodiment of the invention.
Figure 2:
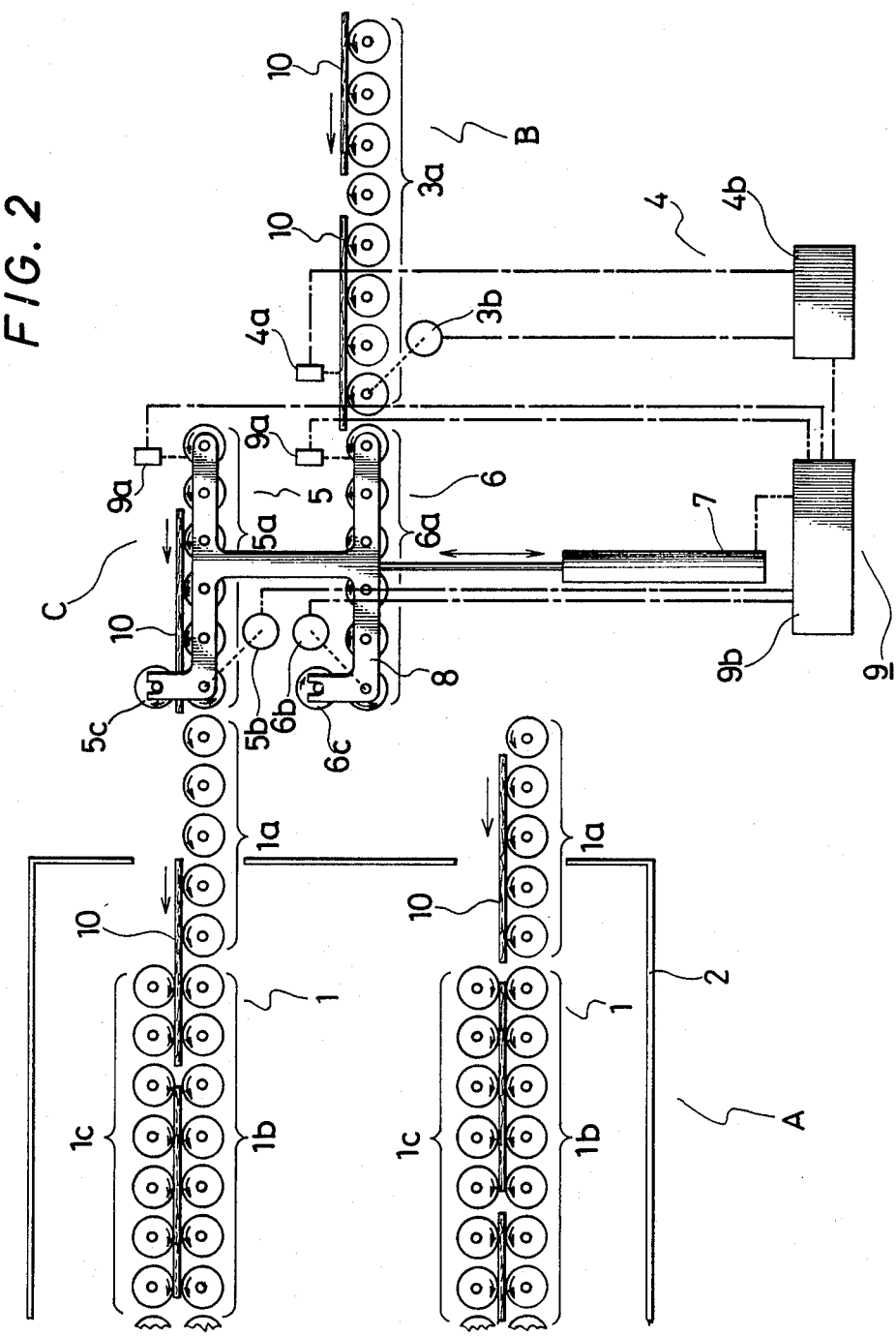

Referring now to FIGS. 1 and 2 of the drawing, a preferred veneer-sheets distributing apparatus according to the invention will now be described. The apparatus is designated by the alphabetical letter "C", and is located between a veneer-sheets conveyor B and a hot-air through-flow veneer drying equipment A.

The drying equipment A includes an enclosure 2 of heat-insulating material and a pair of upper and lower roll conveyors 1 generally located inside the enclosure 2. Each conveyor 1 comprises a group of spaced-part parallel horizontal rolls $1a$ for receiving veneer sheets 10 distributed from the distributing apparatus C, a group of spaced-apart parallel lower horizontal feeding rolls $1b$ located adjacent to the rolls $1a$ and a group of spaced-apart parallel upper horizontal feeding rolls $1c$. As illustrated, some of the receiving rolls $1a$ are located outside the enclosure 2. The rolls $1a$ and $1b$ are rotated counterclockwise (in FIG. 1). The rolls $1c$ are rotated clockwise (in FIG. 1). All the rolls $1a$ $1b$ and $1c$ are rotated at predetermined equal speeds. Hot air is supplied into the enclosure 2 and is circulated therein.

The conveyor B includes spaced-apart parallel horizontal rolls $3a$ and a control mechanism 4. The rolls $3a$ are rotated by an operating means $3b$ which is interconnected to the foremost one of the rolls $3a$. The rolls $3a$ are interconnected by a suitable means (not shown) in such a manner that, when the foremost roll $3a$ is rotated by the operating means $3b$, all the other rolls $3a$ are simultaneously rotated. The rolls $3a$ are rotated counterclockwise (in FIG. 1) at predetermined speeds equal to or greater than twice the speed of rotation of the rolls of the drying equipment A. The control mechanism 4 includes a veneer-sheet detector $4a$ and a controller $4b$. The detector $4a$ and the controller $4b$ are interconnected. Also, the operating means $3b$ is interconnected to the controller $4b$ in order to be controlled by the latter.

The veneer-sheets distributing apparatus C according to the invention comprises a pair of upper and lower relay conveyor means 5 and 6 and a control mechanism 9. Each relay conveyor means includes spaced-apart parallel horizontal relay rolls $5a$ or $6a$ and a horizontal press roll $5c$ or $6c$. The press roll is located directly above the foremost one of the relay rolls ($5a$ or $6a$). The distance between the press roll and the foremost relay roll is slightly smaller than the thickness of a veneer sheet 10. Operating means $5b$ and $6b$ are interconnected to the foremost ones of the relay rolls $5a$ and $6b$, respectively. Each group of relay rolls $5a$ or $6a$ are interconnected by a suitable means (not shown) in such a manner that, when the foremost relay roll is rotated by the associated operating means, all the other relay rolls are simultaneously rotated. The rolls 5a and 6a are rotated counterclockwise (in FIG. 1) at predetermined speeds equal to or greater than the speed of rotation of the rolls 3a of the conveyor B. The control mechanism 9 includes a pair of veneer-sheet detectors 9a located in conjunction with the upper relay conveyor means 5 and the lower relay conveyor means 6, respectively. Also, the control mechanism 9 includes a controller 9b. The detectors 9a and the operating means 5b and 6b are all interconnected to the controller 9b. Also, the controller 4b of the conveyor B is interconnected to the controller 9b in order to be controlled by the latter.

Numeral 8 designates a frame 8 having a pair of upper and lower generally hook-shaped members on each of both sides thereof. FIG. 1 shows only the upper and lower hook-shaped members on one side of the frame 8. The rolls 5a and 5c are mounted to the upper opposed hook-shaped members. The rolls 6a and 6c are mounted to the lower opposed hook-shaped members. A drive means 7 is connected to the frame 8 for vertically moving the frame 8 between a first, lower position and a second, upper position. For example, a piston-type cylinder may be used as the drive means 7. In FIG. 1, the frame 8 is in its lower position. As illustrated in FIG. 1, when the frame 8 is in its lower position, the rolls 5a are parallel to and on the same level as the rolls 3a, thus providing a single, functionally-continuous conveyor means together with the rolls 3a. Also, as illustrated, when the frame 8 is in its lower position, the rolls 6a are parallel to and on the same level as the rolls 1a of the lower roll conveyor 1 of the drying equipment A, thus providing a single, functionally-continuous conveyor means together with the rolls 1a. FIG. 2, the frame 8 is in its upper position. As illustrated in FIG. 2, when the frame 8 is in its upper position, the rolls 5a are parallel to and on the same level as the rolls 1a of the upper roll conveyor 1 of the drying equipment, thus providing a single, functionally-continuous conveyor means together with the rolls 1a. Also, as illustrated, when the frame 8 is in its upper position, the rolls 6a are parallel to and on the same level as the rolls 3a, thus providing a single, functionally-continuous conveyor means together with the rolls 3a. The drive means 7 is interconnected to the controller 9b in order to be controlled by the latter.

In operation, a first veneer sheet 10 is conveyed by the rolls 3a in such an orientation that the fibers of the sheet 10 extend in the direction of conveyance thereof. When the frame 8 is in its lower position (FIG. 1), the sheet 10 is conveyed from the rolls 3a onto the rolls 5a of the upper relay conveyor 5. And when the trailing edge of the sheet 10 has passed the position directly below the center of the sheet detector 9a associated with the upper relay conveyor 5, that detector 9a sends the controller 9b a signal to indicate that the sheet has passed the foregoing position. Upon the receipt of that signal, the controller 9b sends the operating means 5b a signal to stop the operation of the operating means 5b, thereby stopping the rolls 5a from rotating and, hence, stopping the sheet from moving on the rolls 5a. Then, the controller 9b causes the drive means 7 to raise the frame 8 to its upper position (FIG. 2). After the frame 8 has reached its upper position, the controller 9b restarts the operating means 5b to restart the rolls 5a and, hence, the sheet. Thus, the sheet on the rolls 5a moves further to the left (in FIG. 1), and passes between the foremost one of the rolls 5a and the press roll 5c while being slightly pressed, from above, by the roll 5c, and transfers onto the rolls 1a of the upper roll conveyor 1 of the drying equipment A.

When just starting to transfer onto the rolls 1a, the sheet moves on the rolls at a speed substantially equal to or greater than twice the speed of conveyance by the rolls 1a. However, the press roll 5c presses or brakes the sheet to cause the sheet to move at the speed inherent to the rolls 1a before the sheet has entirely projected from between the foremost roll 5a and the press roll 5c.

On the other hand, while the first sheet is being transferred onto the rolls 1a, a next, or second veneer sheet 10 conveyed by the rolls 3a is transferred from the rolls 3a onto the rolls 6a. And when the trailing edge of the second sheet has passed the position directly below the center of the sheet detector 9a associated with the lower relay conveyor 6, that detector 9a sends the controller 9b a signal to indicate that the second sheet has passed the foregoing position. Upon receipt of that signal, the controller 9b sends the operating means 6b a signal to stop the operation of the operating means 6b, thereby stopping the rolls 6a from rotating and, hence, stopping the second sheet from moving on the rolls 6a. Simultaneously the controller 9b also stops the operating means 5b to stop the rolls 5a. Then, the controller 9b causes the drive means 7 to move the frame 8 down to its lower position (FIG. 1). After the frame 8 has reached its lower position, the controller 9b restarts both the operating means 5b and 6b to restart the rolls 5a and 6a. Thus the second sheet on the rolls 6a moves further to the left (in FIG. 1), and passes between the foremost one of the rolls 6a and the press roll 6c while being slightly pressed, from above, by the roll 6c, and transfers onto the rolls 1a of the lower roll conveyor 1 of the drying equipment A.

When just starting to transfer onto the rolls 1a, the sheet moves on the rolls at a speed substantially equal to or greater than twice the speed of conveyance by the rolls 1a. However, the press roll 6c presses or brakes the sheet to cause the sheet to move at the speed inherent to the rolls 1a before the sheet has entirely projected from between the foremost roll 6a and the press roll 6c.

On the other hand, while the second sheet is being transferred onto the rolls 1a, a next, or third veneer sheet 10 conveyed by the rolls 3a is transferred from the rolls 3a onto the rolls 5a in the same manner as the first veneer sheet. When the rolls 5a are stopped, the rolls 6a are simultaneously stopped. Then, the frame 8 is moved to its upper position (FIG. 2) again for the distribution of the third sheet.

The veneer sheets are thus alternately distributed to the upper and lower roll conveyors 1 of the drying equipment A.

In the event that the leading edge of a veneer sheet conveyed by the rolls 3a has reached the position directly below the center of the sheet detector 4a during the vertical movement of the frame 8, in other words, before the arrival of the rolls 5a or 6a in the position aligned with the rolls 3a, the controller 4b stops the operation of the operating means 3b to stop the rolls 3a from rotating, thus stopping the sheet. And after the rolls 5a or 6a have arrived in the foregoing position, the controller 4b restarts the rolls 3a simultaneously with the restarting of the rolls 5a or 6a by the controller 9b. Thus, even in the foregoing event, the sheet is certainly transferred onto the rolls 5a or 6a. Therefore, the sheet may be conveyed by the rolls 3a, or the conveyor B, at relatively short intervals.

Figure 3:
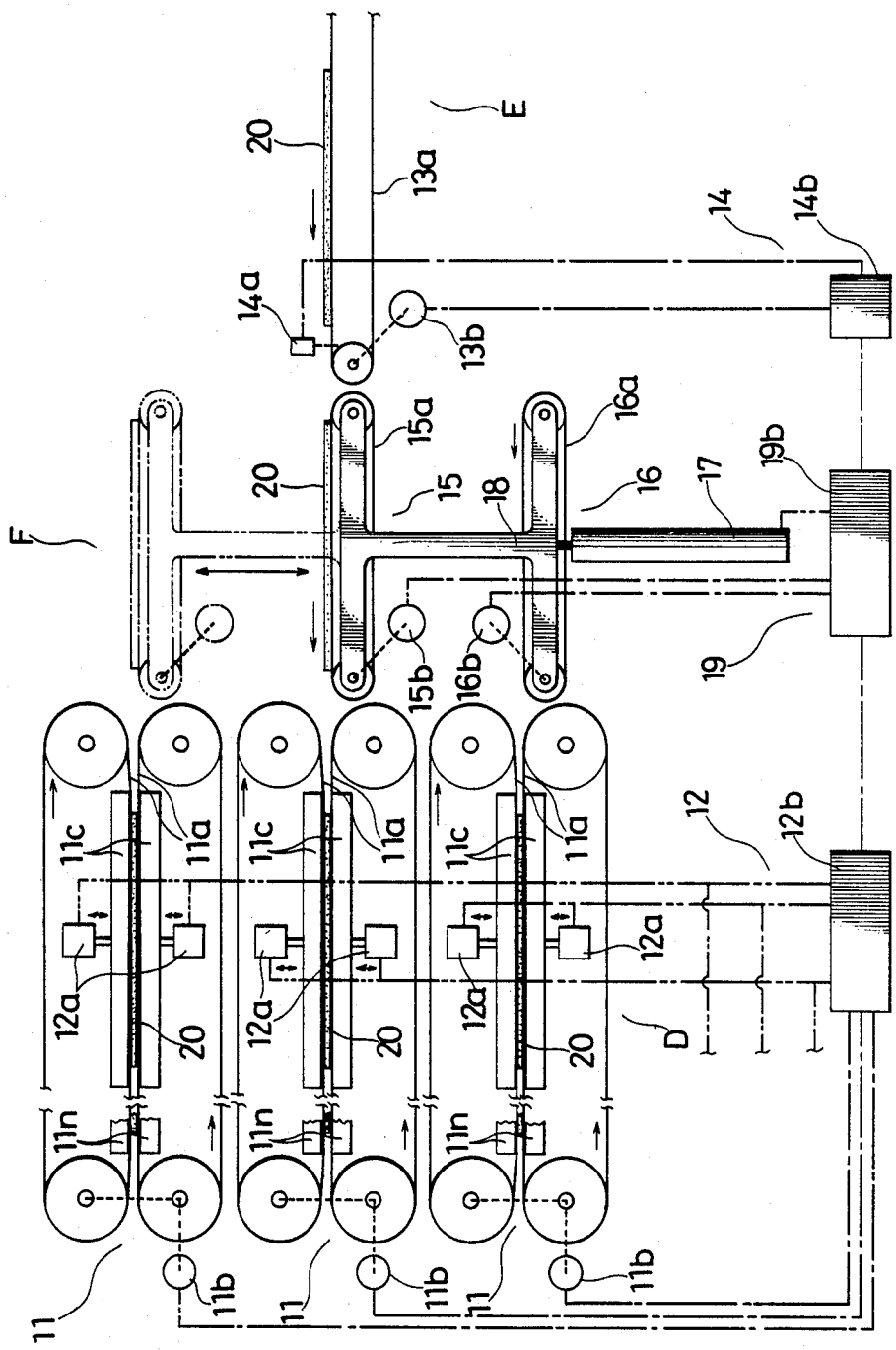
FIG. 3 shows a second embodiment of the invention.

FIG. 3 illustrates another preferred veneer-sheets distributing apparatus according to the invention. The apparatus is designated by the alphabetical letter "F", and is located between a veneer-sheets conveyor E and an indirect heating dryer D.

The dryer D comprises upper, middle and lower drying mechanisms 11 and a control mechanism 12. The three drying mechanisms 11 are spaced apart from one another at equal intervals. Each drying mechanism includes a pair of upper and lower conveyor belts 11a with relatively large widths. A veneer sheet is conveyed from the distributing apparatus F between the belts 11a. A suitable number of pairs of upper and lower heating plates 11c to 11n are provided for each drying mechanism. The upper heating plates are used in conjunction with the upper belt, and the lower heating plates are used in conjunction with the lower belt. The control mechanism 12 includes actuators 12a and a controller 12b. Each actuator 12a is connected to one of the heating plates, and is interconnected to the controller 12b. The actuators 12a may comprise cams, piston-type cylinders or other suitable means. The controller 12b controls each actuator 12a such that the actuator causes the associated heating plate to intermittently and vertically move into contact with or away from the associated conveyor belt. Also, the conveyor belts are intermittently moved, in directions indicated by arrows, by operating means 11b which are all interconnected to the controller 12b and are controlled thereby. The control of the controller is such that, for each drying mechanism, the intermittent vertical movements of the heating plates and the intermittent movements of the conveyor belts are effected in a synchronous manner. When the heating plates 11c to 11n are in contact with the associated belts, the plates may indirectly heat or dry a veneer sheet conveyed from the distributing apparatus F between the upper and lower belts 11a.

The conveyor E includes a conveyor belt 13a and a control mechanism 14. The conveyor belt 13a is moved by an operating means 13b. The belt 13a has its top surface on the same level as the lower belt 11a of the middle drying mechanism 11 of the dryer D. The control mechanism 14 includes a veneer detector 14a and a controller 14b. The detector 14a and the operating means 13b are interconnected to the controller 14b. The controller 14b controls the operating means 13b such that the latter moves the belt 13a, in a direction indicated by an arrow, at a speed selected on the basis of the intermittent operation of the dryer D.

The veneer-sheets distributing apparatus F includes a frame 18 having a pair of upper and lower horizontal members, or a pair of upper and lower relay conveyor means 15 and 16 which are interconnected by a vertical member. Each relay conveyor means includes a relay conveyor belt 15a or 16a. The belts 15a and 16a are moved by operating means 15b and 16b, respectively, in directions indicated by arrows and the same speed as either the belt 13a of the conveyor E or the belts 11a of the dryer D. A drive means 17 is connected to the frame 18 for vertically moving the frame 18 between a first, lower position and a second, upper position. The apparatus F also includes a controller 19b. The drive means 17 and the operating means 15b and 16b are all interconnected to the controller 19b. Also, the controller 14b of the conveyor E and the controller 12b of the dryer D are both interconnected to the controller 19b.

In FIG. 3, the frame 18 is in its lower position. As illustrated in FIG. 3, when the frame 18 is in its lower position, the upper conveyor belt 15a has its top surface on the same level as both the belt 13a of the conveyor E and the lower belt 11a of the middle drying mechanism 11 of the dryer D. Also, as illustrated, when the frame 18 is in its lower position, the lower conveyor belt 16a has its top surface on the same level as the lower belt 11a of the lower drying mechanism 11 of the dryer D. A broken line of FIG. 3 represents the upper position of the frame 18. When the frame 18 is in its upper position, the upper belt 15a has its top surface on the same level as the lower belt 11a of the upper drying mechanism of the dryer D. Also, when the frame 18 is in its upper position, the lower belt 16a has its top surface on the same level as both the belt 13a of the conveyor E and the lower belt 11a of the middle drying mechanism of the dryer D.

In operation, a first veneer sheet 20 is conveyed by the conveyor 13a in such an orientation that the fibers of the sheet extend in the direction perpendicular to the direction of conveyance thereof. When the frame 18 is in its lower position (FIG. 3), the sheet 20 is conveyed from the conveyor belt 13a onto the upper conveyor belt 15a of the distributing apparatus F. The belt 15a is now being moved at the same speed as the belt 13a. And when the trailing edge of the sheet has passed the position directly below the center of the sheet detector 14a, the detector 14a sends the controller 14b a signal to indicate that the sheet has passed that position. Upon receipt of that signal and upon the arrival of the entire sheet on the conveyor belt 15a, the controller 14b sends the controller 19b a signal to stop the operation of the operating means 15b, thereby stopping the belt 15a and hence, stopping the sheet. Then, the controller 19b causes the drive means 17 to raise the frame 18 to its upper position (indicated by the broken line).

After the arrival of the frame 18 in its upper position and simultaneously with (or, if necessary, slightly later than) the start of the synchronous movements of the heating plates and of the belts 11a of the upper drying mechanism of the dryer D, the controller 19b sends the operating means 15b a signal for starting the belt 15a again, but now at the same speed as the belts 11a. The first sheet 20 is thus conveyed from the upper relay conveyor belt 15a between the upper and lower conveyor belts 11a of the upper drying mechanism. And immediately when the entire sheet has come to the position between the first pair of the heating plates, the speed of the movement of the belt 15a is changed to the same speed as that of the belt 13a again.

On the other hand, while the first sheet is being transferred into the upper drying mechanism, a next, or second veneer sheet 20 conveyed by the belt 13a is transferred from the belt 13a onto the lower relay belt 16a. The belt 16a is now being moved at the same speed as the belt 13a. And when the trailing edge of the sheet has passed the position directly below the center of the sheet detector 14a, the detector 14a sends the controller 14b a signal to indicate that the sheet has passed that position. Upon the receipt of that signal and upon the arrival of the entire sheet on the conveyor belt 16a, the controller 14b sends the controller 19b a signal to stop the operation of the operating means 16b, thereby stopping the belt 16a and, hence, stopping the sheet. And simultaneously with with the start of the synchronous movements of the heating plates and of the belts 11a of the middle drying mechanism of the dryer D, the controller 19b sends the operating means 16b a signal for starting the belt 16a again, but now at the same speed as the belts 11a. The second sheet is thus transferred from the lower relay conveyor belt 16a between the upper and lower conveyor belts 11a of the middle drying mechanism. And immediately when the entire sheet has come to the position between the first pair of the heating plates 11c, the speed of the movement of the belt 16a is changed to the same speed as that of the belt 13a again. A third veneer sheet 20 is conveyed by the belt 13a and is transferred onto the belt 16a. And when the trailing edge of the sheet has passed the position directly below the center of the sheet detector 14a, the detector 14a sends the controller 14b a signal to indicate that the sheet has passed that position. Upon the receipt of that signal and upon the arrival of the entire sheet on the conveyor belt 16a, the controller 14b sends the controller 19b a signal to stop the operation of the operating means 16b, thereby stopping the belt 16a and, hence, stopping the sheet. Then, the controller 19b causes the drive means 17 to move the frame 18 to its lower position (FIG. 3). After the arrival of the frame 18 in its lower position and simultaneously with the start of the synchronous movements of the heating plates and of the belts 11a of the lower drying mechanism of the dryer D, the controller 19b sends the operating means 16b a signal for starting the belt 16a at the same speed as the belts 11a. The third sheet is thus transferred from the lower relay belt 16a between the upper and lower conveyor belts 11a of the lower drying mechanism.

On the other hand, while the third sheet is being transferred onto the lower drying mechanism, a fourth veneer sheet is conveyed from the belt 13a onto the upper relay belt 15a for the purpose of being conveyed into the upper drying mechanism as the first sheet was conveyed there.

Thus, the distributing apparatus of FIG. 3 enables veneer sheets to be distributed into the upper, middle and lower drying mechanisms in the order mentioned.

The control mechanism 14 has the same function as the control mechanism 4 of the first embodiment.

Figure 4:
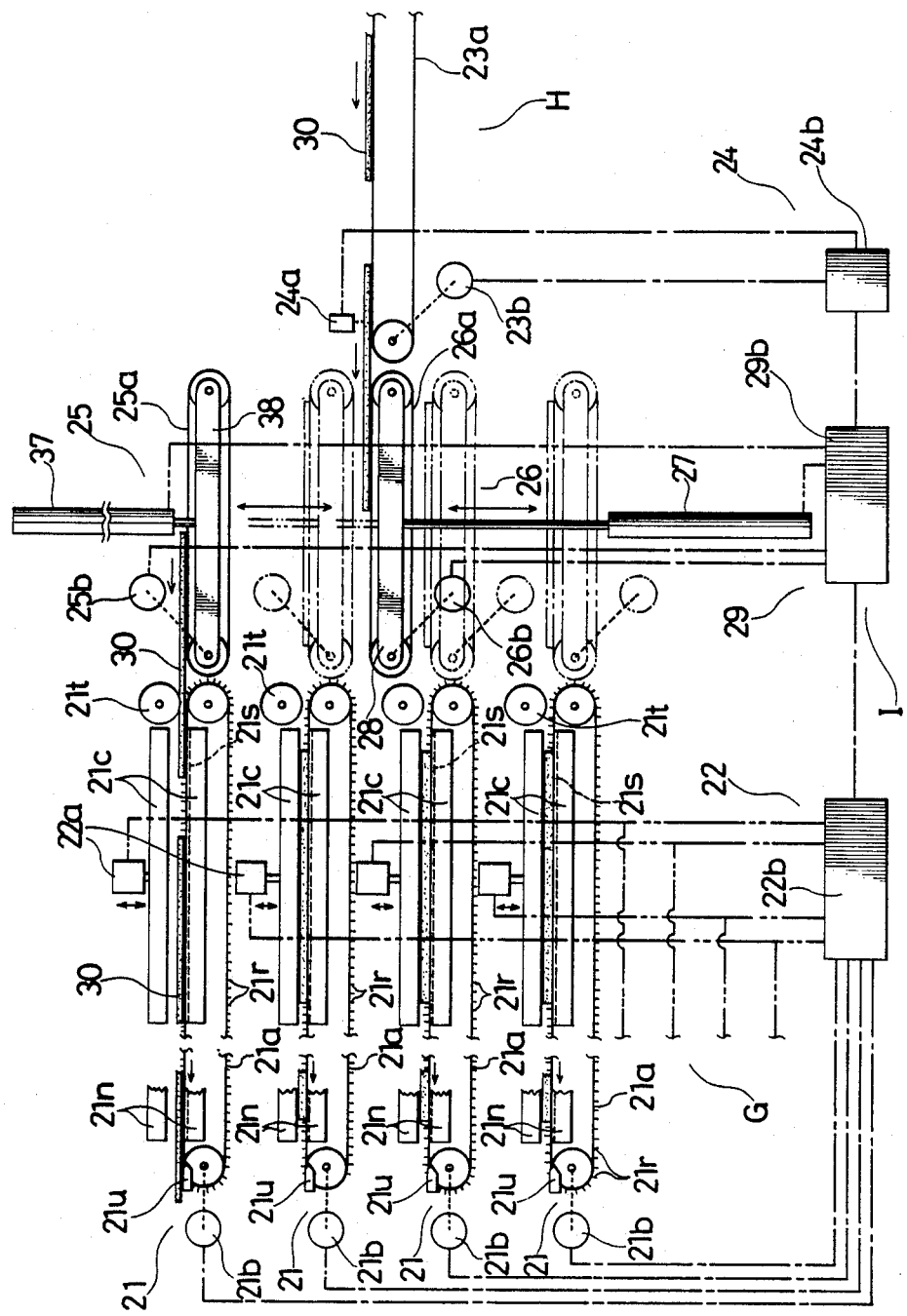
FIG. 4 shows a third embodiment of the invention.

FIG. 4 illustrates still another preferred veneer-sheets distributing apparatus according to the invention. The apparatus is designated by the aliphabetical letter "I", and is located between a veneer-sheets conveyor H and an indirect heating dryer G.

The dryer G comprises four drying mechanisms 21 and a control mechanism 22. The drying mechanism 21 include first, second, third and fourth drying mechanisms 21 in order of height. The four drying mechanisms 21 are spaced apart from one another at equal intervals. Each drying mechanism 21 includes a conveyor belt 21a having needles 21r on its surface. A veneer sheet is conveyed from the distributing apparatus I onto the belt 21a. The needles 21r pierce the sheet. Each drying mechanism also includes a suitable number of pairs of upper and lower heating plates 21c to 21n. The upper heating plate is located above the associated belt 21a. The lower heating plate is disposed in a recess 21s which is provided below the upper and lower portions of the associated belt 21a. Each drying mechanism 21 also includes a press roll 21t which is located in close proximity to the inlet end of the belt 21a and which is not connected to any operating means. Also, each drying mechanism includes a means located at the outlet end of the belt 21a for removing the veneer sheet from the belt. The control mechanism 22 includes actuators 22a and a controller 22b. Each actuator 22a is connected to one of the upper heating plates of one of the drying mechanisms, and is interconnected to the controller 22b. The actuators 22a may comprise cams, piston-type cylinders or other suitable means. The controller 22b controls each actuator 22a such that the actuator causes the associated upper heating plate to intermittently and vertically move into contact with or away from the veneer sheet conveyed by the belt 21a. The lower heating plate is not vertical. The conveyor belts 21a are intermittently moved, in directions indicated by arrows, by operating means 21b which are all interconnected to the controller 22b and are controlled thereby. The control of the controller 22b is such that, for each drying mechanism, the intermittent vertical movements of the upper heating plates and the intermittent movements of the conveyor belts 21a are effected in a synchronous manner. The upper heating plates directly heats or dries the sheet by making contact therewith, but the lower heating plates heats or dries it through the upper portion of the belt.

The conveyor H includes a conveyor belt 23a and a control mechanism 24. The conveyor belt 23a is moved by an operating means 23b. The control mechanism 24 includes a veneer detector 24a and a controller 24b. The detector 24a and the operating means 13b are interconnected to the controller 24b. The controller 24b controls the operating means 23b such that the latter moves the belt 23a, in a direction indicated by an arrow, at a speed selected on the basis of the intermittent operation of the dryer G.

The veneer-sheets distributing apparatus I includes a pair of separate upper and lower relay conveyor means 25 and 26. Each relay conveyor means includes a relay conveyor belt 25a or 26a. The belts 25a and 26a are moved by operating means 25b and 26b, respectively, in directions indicated by arrows and at the same speed as either the belt 23a of the conveyor H or the belts 21a of the dryer G. Drive means 37 and 27 are connected to the upper and lower conveyor means 25 and 26, respectively, for vertically moving the respective associated conveyor means. The apparatus I also includes a controller 29b. The drive means 27 and 37 and the operating means 25b and 26b are all interconnected to the controller 29b. Also, the controller 24b of the conveyor H and the controller 22b of the dryer G are both interconnected to the controller 29b.

The upper relay conveyor means 25 is moved between its lowest position where its belt 25a has its top surface on the same level as the belt 21a of the conveyor H and where the belt 25a receives a veneer sheet 30 from the belt 23a and its uppermost position where the belt 25a has its top surface on the same level as the belt 21a of the first drying mechanism of the dryer G and where the belt 25a transfers the sheet therefrom onto the belt 21a of the first drying mechanism. In addition, the upper means 25 has a middle position where its belt 25a has its top surface on the same level as the belt 21a of the second drying mechanism and where the belt 25a transfers onto the belt 21a of the second drying mechanism another veneer sheet received from the belt 23a when the upper means 25 was in its lowest position.

The lower relay conveyor means 26 is moved between its uppermost position where its belt 26a has its top surface on the same level as the belt 21a of the conveyor H and where the belt 26a receives a veneer sheet 30 from the belt 23a and its lowest position where the belt 26a has its top surface on the same level as the belt 21a of the fourth drying mechanism of the dryer G and where the belt 26a transfers the sheet therefrom onto the belt 21a of the fourth drying mechanism. In addition, the lower means 26 has a middle position where its belt 26a has its top surface on the same level as the belt 21a of the third drying mechanism and where the belt 26a transfers onto the belt 21a of the third drying mechanism another veneer sheet received from the belt 23a when the lower means 26 was in its uppermost position.

The veneer sheet 30 is conveyed in an orientation where its fibers extend in the direction perpendicular to the direction of conveyance of the sheet 30.

Figure 5:
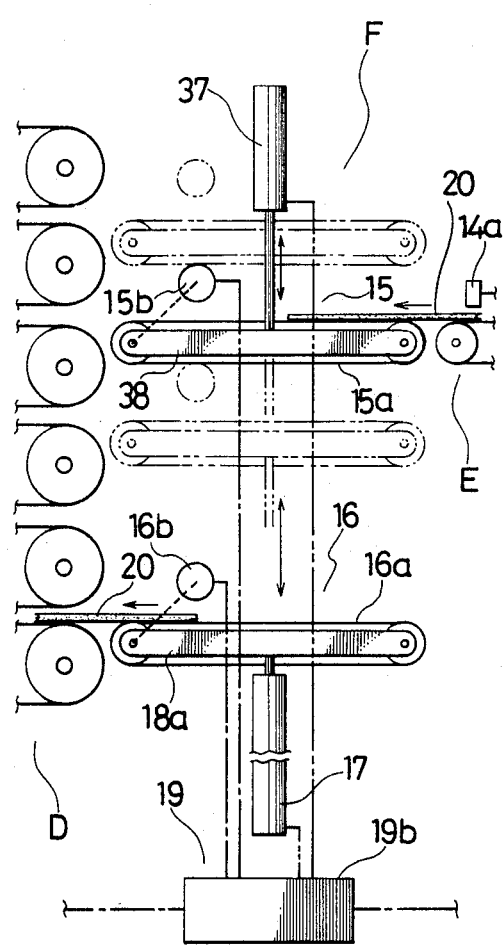
FIG. 5 shows a fourth embodiment of the invention.
Figure 6:
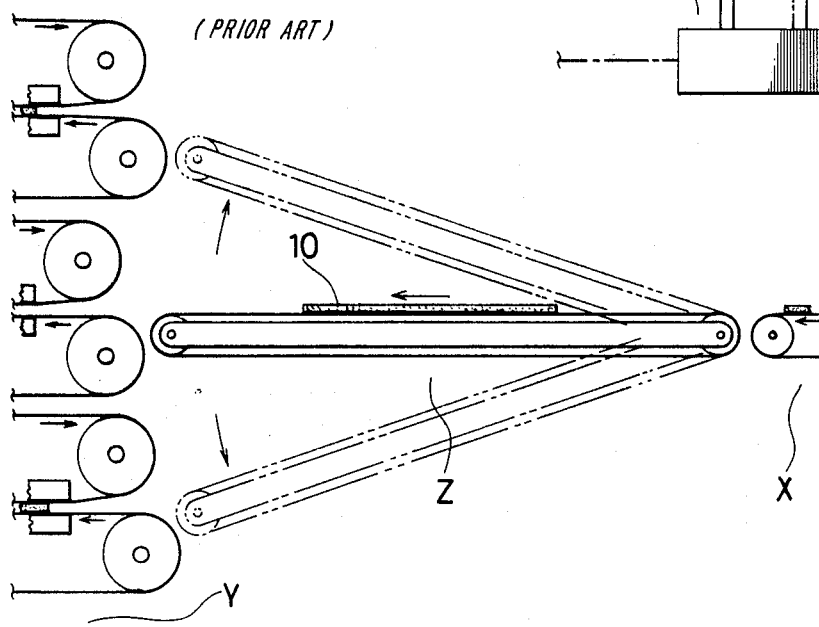
FIG. 6 shows a swinging-type veneer sheets distributing apparatus of the prior art.

FIG. 5 illustrates another veneer-sheets distributing apparatus which may be used between the conveyor E and the dryer D of FIG. 3. The apparatus F of FIG. 5 includes a pair of separate upper an lower relay conveyor means 15 and 16. Each relay conveyor means includes a relay conveyor belt 15a or 16a. Drive means 37 and 17 are connected to the upper and lower conveyor means 25 and 26, respectively, for vertically moving the respective associated conveyor means. The upper conveyor means 15 transfers a veneer sheet 14 into the upper drying mechanism. The lower conveyor means 16 transfers veneer sheets 14 into the middle and lower drying mechanisms.

If desired, the embodiments of FIGS. 3, 4 and 5 may be provided with veneer sheet detectors corresponding to the detectors 9a of the embodiment of FIG. 1.

Any of the veneer-sheets distributing apparatus according to the invention distributes veneer sheets, without being swung, to a veneer treating system (such as a veneer drying system) having treating sections of different heights. Thus the apparatus is capable of distributing or conveying sheets from the preceding conveyor (such as B, E or H) to the treating system in a stable manner. Also, since the apparatus is not of a swinging type, its relay conveyor means may have lengths substantially equal to or only slightly greater than the length of the sheet. Thus the entire apparatus occupy less space than the swinging-type of distributing apparatus.

Also, particularly as seen from the drying systems of FIGS. 3 and 4, since the apparatus of the invention is not of a swinging type, a veneer treating system with plural treating sections of different heights having front ends exactly aligned in a vertical direction may be used. It means that a veneer treating system with plural treating sections of different heights having exactly vertically-aligned components (e.g., exactly vertically-aligned heating plates) may be used.

For any of the foregoing distributing apparatus, if necessary, the means of the conveyor, of the distributing apparatus and of the drying system for conveying the sheet may be operated at the same speed.

What is claimed is:

1. An apparatus for distributing veneer sheets received from a veneer conveyor to a veneer treating system having plural treating sections of different heights, comprising
   (a) a vertically-movable upper relay conveyor means for receiving veneer sheets, one by one, from the veneer conveyor and supplying the sheets, one by one, to one of the treating sections of the treating system,
   (b) a vertically-movable lower relay conveyor means for receiving veneer sheets, one by one, from the veneer conveyor and supplying the sheets, one by one, to another one of the treating sections of the treating system, and
   (c) means for conveying a veneer sheet to one of the two relay conveyor means while the other relay conveyor means is supplying a veneer sheet to its associated treating section.

* * * * *

UNITED STATES PATENT AND TRADEMARK OFFICE
CERTIFICATE OF CORRECTION

PATENT NO. : 4,867,299

DATED : September 19, 1989

INVENTOR(S) : Fukuoka et al.

It is certified that error appears in the above-identified patent and that said Letters Patent is hereby corrected as shown below:

On title page of the patent, left hand column, in section [73], Assignee, before the word "Meinan", insert --Taihei Machinery Works, Ltd., and--.

UNITED STATES PATENT AND TRADEMARK OFFICE
CERTIFICATE OF CORRECTION

PATENT NO. : 4,867,299

DATED : September 19, 1989

INVENTOR(S) : Fukuoka et al.

It is certified that error appears in the above-identified patent and that said Letters Patent is hereby corrected as shown below:

Column 2, line 27, delete "spaced-part" and insert --spaced-apart--.

Column 2, line 36, delete "1a", and insert --1a,--.

Column 5, line 26, delete "conveyer belt  Also,", and insert --conveyer belt.  Also,--.

Signed and Sealed this

Twenty-first Day of May, 1991

Attest:

HARRY F. MANBECK, JR.

Attesting Officer

Commissioner of Patents and Trademarks